(12) United States Patent
Khesali

(10) Patent No.: US 8,881,517 B2
(45) Date of Patent: Nov. 11, 2014

(54) WATER-WAVE/FLOWING-WATER ENERGY TRANSFORMER

(76) Inventor: Azizollah Khesali, Mashad (IR)

(*) Notice: Subject to any disclaimer, the term of this patent is extended or adjusted under 35 U.S.C. 154(b) by 1051 days.

(21) Appl. No.: 12/825,379

(22) Filed: Jun. 29, 2010

(65) Prior Publication Data

US 2011/0316280 A1 Dec. 29, 2011

(51) Int. Cl.
F16D 31/02 (2006.01)
F03B 13/18 (2006.01)
F03B 17/02 (2006.01)

(52) U.S. Cl.
CPC ............ *F03B 13/1815* (2013.01); *F03B 17/02* (2013.01); *Y02E 10/38* (2013.01); *Y02E 10/20* (2013.01)
USPC .......................... 60/398; 416/139; 416/197 A

(58) Field of Classification Search
USPC ........ 60/398; 416/111, 119, 131, 139, 197 A; 290/42, 43, 53, 54; 415/7
See application file for complete search history.

(56) References Cited

U.S. PATENT DOCUMENTS

| | | | | | |
|---|---|---|---|---|---|
| 98,392 | A | * | 12/1869 | Lowden | 416/119 |
| 650,063 | A | * | 5/1900 | Kersten | 60/496 |
| 958,467 | A | * | 5/1910 | Bennett | 415/8 |
| 1,120,109 | A | * | 12/1914 | Watson | 416/119 |
| 1,653,970 | A | * | 12/1927 | Rugger | 415/121.3 |
| 1,709,229 | A | * | 4/1929 | Pedley | 416/147 |
| 3,879,950 | A | * | 4/1975 | Yamada | 60/698 |
| 4,104,536 | A | * | 8/1978 | Gutsfeld | 290/54 |
| 4,160,624 | A | * | 7/1979 | Smith | 417/330 |
| 4,407,130 | A | * | 10/1983 | Jackson | 60/496 |
| 4,625,124 | A | * | 11/1986 | Ching-An | 290/42 |
| 5,027,000 | A | * | 6/1991 | Chino et al. | 290/53 |
| 5,946,909 | A | * | 9/1999 | Szpur | 60/398 |
| 6,210,113 | B1 | * | 4/2001 | Ihrenberger | 416/116 |
| 6,431,821 | B1 | * | 8/2002 | Feltenberger et al. | 415/3.1 |
| 7,462,949 | B2 | * | 12/2008 | Coman | 290/54 |
| 7,830,032 | B1 | * | 11/2010 | Breen | 290/53 |
| 2002/0195823 | A1 | * | 12/2002 | Aguirre | 290/53 |
| 2008/0012344 | A1 | * | 1/2008 | Buffard et al. | 290/53 |
| 2008/0231057 | A1 | * | 9/2008 | Zeuner | 290/54 |

* cited by examiner

*Primary Examiner* — Edward Look
*Assistant Examiner* — Michael Quandt
(74) *Attorney, Agent, or Firm* — Nasser Ashgriz; UI Patent Inc.

(57) ABSTRACT

The present invention is a device and a method of generating large scale power plant using the energy content in ocean waves or river-channel flows. Ocean waves or flowing waters are used to generate compressed air. The pressurized air is then piped to shore and stored in large pressure tanks to be used in a buoyancy driven wheel rings. The wheel rings, which are located inside a large water reservoir, are spaced from each other and have series of receptacles or buckets connected to them. The high pressure air is injected at the bottom of the reservoir and the rising air is trapped inside the receptacles. The gas filled receptacles generate buoyancy forces which rotates the wheels and the central shaft to generate power.

3 Claims, 24 Drawing Sheets

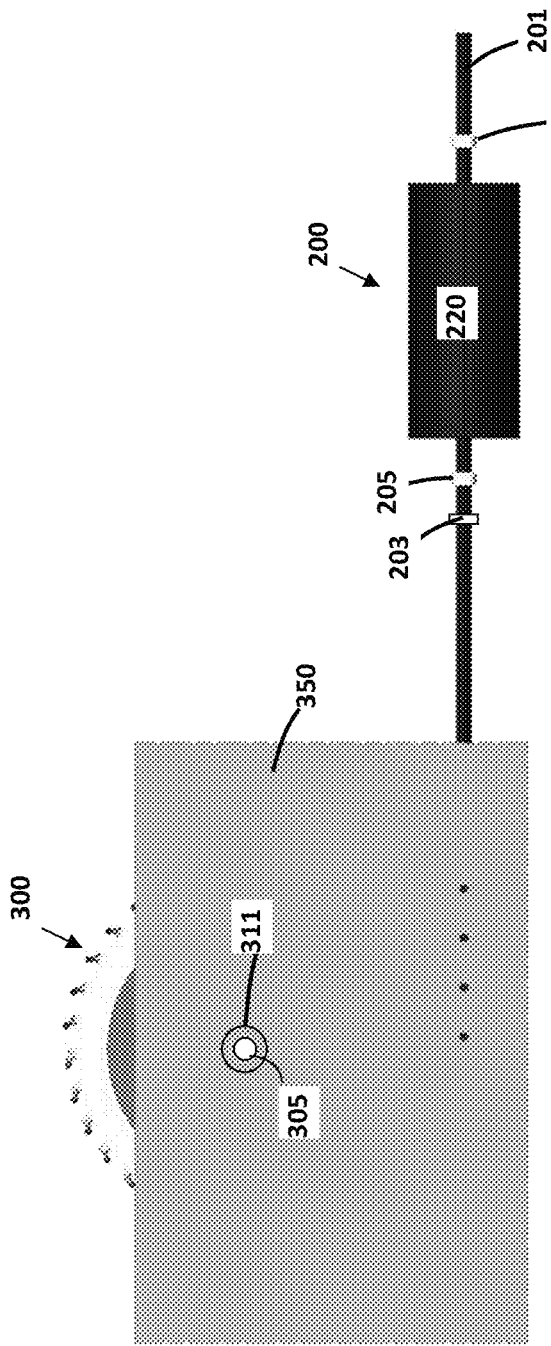
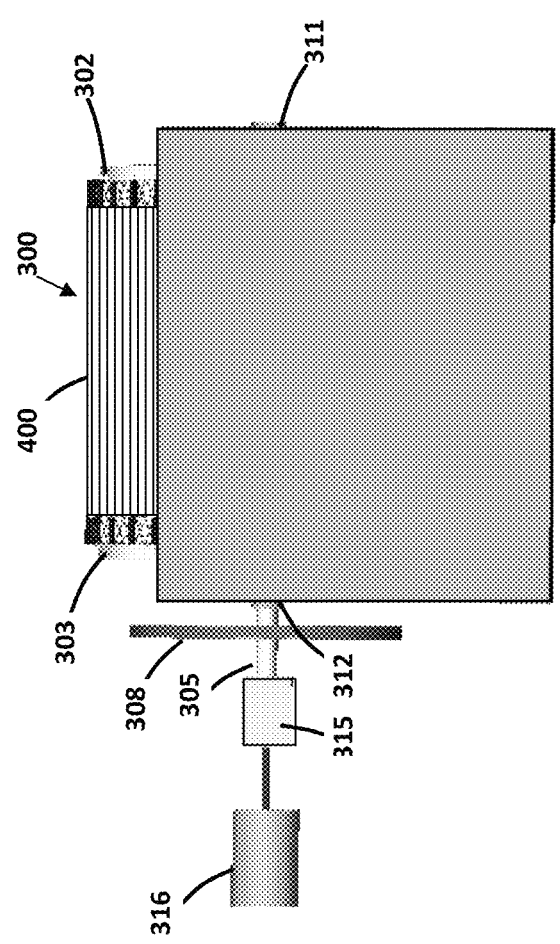
FIG. 6a
FIG. 6b

WATER-WAVE/FLOWING-WATER ENERGY TRANSFORMER

FIELD OF THE INVENTION

The present invention relates to alternative energy devices in which ocean waves or flowing waters are used as the source of energy and buoyancy force as the energy transformer.

DESCRIPTION OF THE RELATED ART

It has been long known that ocean waves or river water flows can be utilized to generate energy. Utilization of only a small fraction of the available ocean wave energy will support the global energy needs. However, because of the dispersity of the water waves, a single practical device is not yet available to provide enough power to develop a relatively large power plant for more wide spread energy utilization.

Many ocean wave energy converters have been invented and developed that use the up and down motion of the water waves to generate power. Large converters have significant environmental impacts, such as physical alteration of coastlines and coastal erosion, impact on the marine ecology, and hazards to shipping. On the other hand, small ocean wave energy converters produce a relatively small amount of power (for instance, enough to light up a board walk).

In order to generate large amounts of power, a large number of ocean wave energy converters have to be located off-shore and away from the costal line and scattered enough to minimize the negative environmental impacts. The small energies collected by the off-shore converters have to be transferred to a large plant. If each converters has an electricity generator on board, the electricity can be brought back to shore. However, this has many practical problems associated with it, and is usually costly to maintain. In the present power plant, the energy is stored in the form of high pressure air. High pressure air can be easily brought to shore and collected in storage tanks providing a large source of potential energy. Hereinafter, the present system will be referred to as the "ocean wave energy transformer" (OWET) for ocean off-shore system and the "river/open channel water energy transformer (ROCWET) for river and open-channel water flow off-shore systems.

Once the scattered energies of ocean waves or river flows are collected and stored in storage tanks in the form of compressed air, the next step is to convert this potential energy into shaft work and then into electricity. This can be achieved using a compressed air operated gas turbine, such as the one disclosed in U.S. Pat. No. 5,553,454. However, this method requires very high air pressures to be efficient.

Buoyancy driven devices are also used to generate rotating shaft work. These devices require a lower air pressure than the pressure required for the gas turbine power generators. Buoyancy driven devices utilize the density difference between a gas (e.g., air) and a liquid (e.g., water) to generate a buoyancy force. Since gas will rise if injected at a bottom of a liquid reservoir, the rising force is utilized to generate a rotating shaft work. For instance, U.S. Pat. Nos. 124,843 and 4,363,212 introduce containers placed in the path of a rising gas. The gas enters each container and displaces an equal volume of liquid from the container. According to Archimedes' principle, this will create a buoyancy force in the container which is equal to the weight of the displaced liquid. A plurality of containers are attached to a chain or belt to form a continuous loop. Containers can move in a vertical direction upwards or downwards through the liquid. Note also that as the pressure on the gas reduces, its volume increases, and therefore, more liquid is displaced and the buoyancy force is increased.

Eventhough, the ocean wave energy source is essentially limitless, its utilization as a major power source has not been practical. The present method of utilization of ocean waves allows development of large scale power plants with minimal environmental impact. The method collects disperse wave energies from off-shore platforms and transfers all energies to an on-shore plant through collection of high pressure air. The high pressure air is then used to generate shaft work in a buoyancy driven air-wheel with rising air in a large water reservoir.

SUMMARY OF THE INVENTION

The present invention is a method of generating large scale power plant using the energy content in ocean waves or river-channel flows. In the ocean wave system, a buoy type ocean wave energy transformer (OWET) is used to convert the up and down motion of ocean waves into a longitudinal shaft motion, which in turn, compresses air. And in the river-open channel water flows a water wheel type of transformer (ROCWET) for river off-shore system is utilized to generate high pressure air. The pressurized air is then piped to shore and stored in large pressure tanks to be used in a buoyancy driven wheel rings. The wheel rings, which are located inside a large water reservoir, are spaced from each other and have series of receptacles or buckets connected to them. The wheel rings are connected to each other through a central shaft. The high pressure air is injected at the bottom of the reservoir and the rising air is trapped inside the receptacles. The gas filled receptacles generate buoyancy forces which rotates the wheels and the central shaft.

Accordingly, the main object of the present device is to collect small energy sources from numerous off-shore ocean wave energy transformers or river-open channel water flow transformers into a single large energy source to generate power on-shore.

Another object of the present device is to utilize ocean waves or water flows to generate high pressure air, which can be easily transferred from off-shore platforms to on-shore power plant and stored in high pressure air reservoirs.

A further object of the present device is to utilize the buoyancy force to generate power from compressed air. This has several advantages over more conventional use of gas turbine to generate power. Gas turbines that use compressed air require significant amount of air at very high pressures and high flow velocities. A large portion of the air is used to overcome the frictional forces inside the turbine blades. The present buoyancy driven generator operates at higher efficiency and requires much less pressure than the existing gas turbine devices.

Yet another object of the present invention is that it can be easily scaled. Scaling of the power systems is a very difficult task, since most power generation systems involve complex fluid/thermal processes. The present power generation systems can be easily scaled using the size of the air-wheel.

These and other objects of the present invention will become readily apparent upon further review of the following specification and drawings. To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the figures, which illustrate, by way of example only, embodiments of the present invention.

FIG. 6 illustrates (a) a side view and (b) a front view of an on-shore compressed air driven power plant;

DETAILED DESCRIPTION OF THE INVENTION

The present invention is a method of harnessing energies contained in ocean wave or water flow of rivers and open channels to operate a buoyancy driven air-wheel to generate power. High pressure air is generated by the up and down motion of the ocean waters or by the flowing water systems such as rivers or canals.

Figure 1:
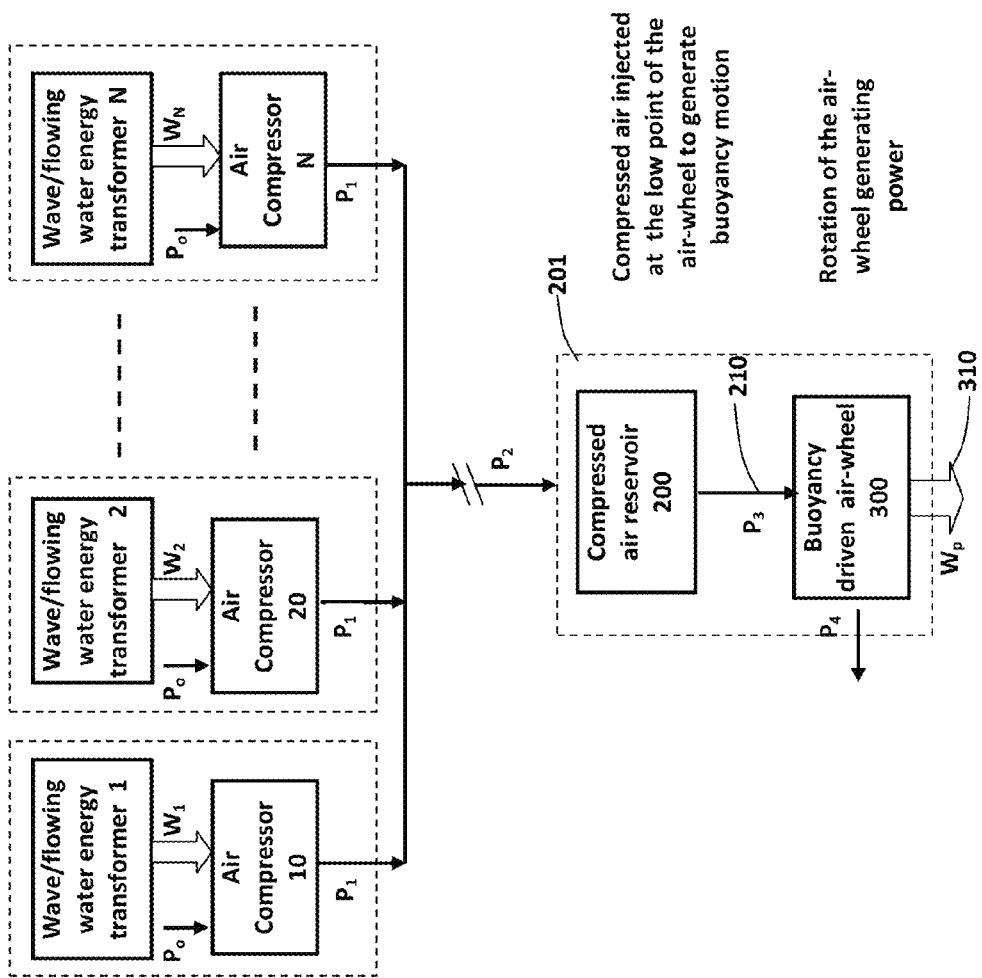
FIG. 1 illustrates a schematic of the processes involved in the present power plant.

FIG. 1 illustrates different elements of the present power generation system. The source of energy in this power plant is from the water waves or other moving waters. Water wave energy is harnessed using offshore ocean wave energy transformers (OWET) or river-open channel water transformers (ROCWET). In order to prevent environmental and other impacts to costal lines, the energy transformers have to be small and have to be installed on off-shore platforms. Therefore, in order to provide enough power to operate a medium to large size power plant, a large number of energy transformers are needed.

FIG. 1 illustrates several ocean wave energy transformers, 1-N, located off-shore. Each transformer generates enough power, $W_1, W_2, \ldots$, to operate air compressors 10, 20, N, located on the platform. The energy transformer system together with the air compressor is referred to as the "ocean wave energy transformer," or OWET. Atmospheric air at pressure $P_o$, is compressed to a higher pressure $P_1$, on each platform. The compressed air from all of the platforms is carried to an on-shore power plant and stored in large compressed air tanks 200. The compressed air stored in the tank is then used to operate a buoyancy driven power generator 300 to generate power 310. The air pressure $P_3$ and air quantity (mass flow rate) leaving the tank being large enough to operate a large air-wheel located inside a water reservoir. The air is finally exhausted to the atmosphere at $P_4$.

Figure 2:
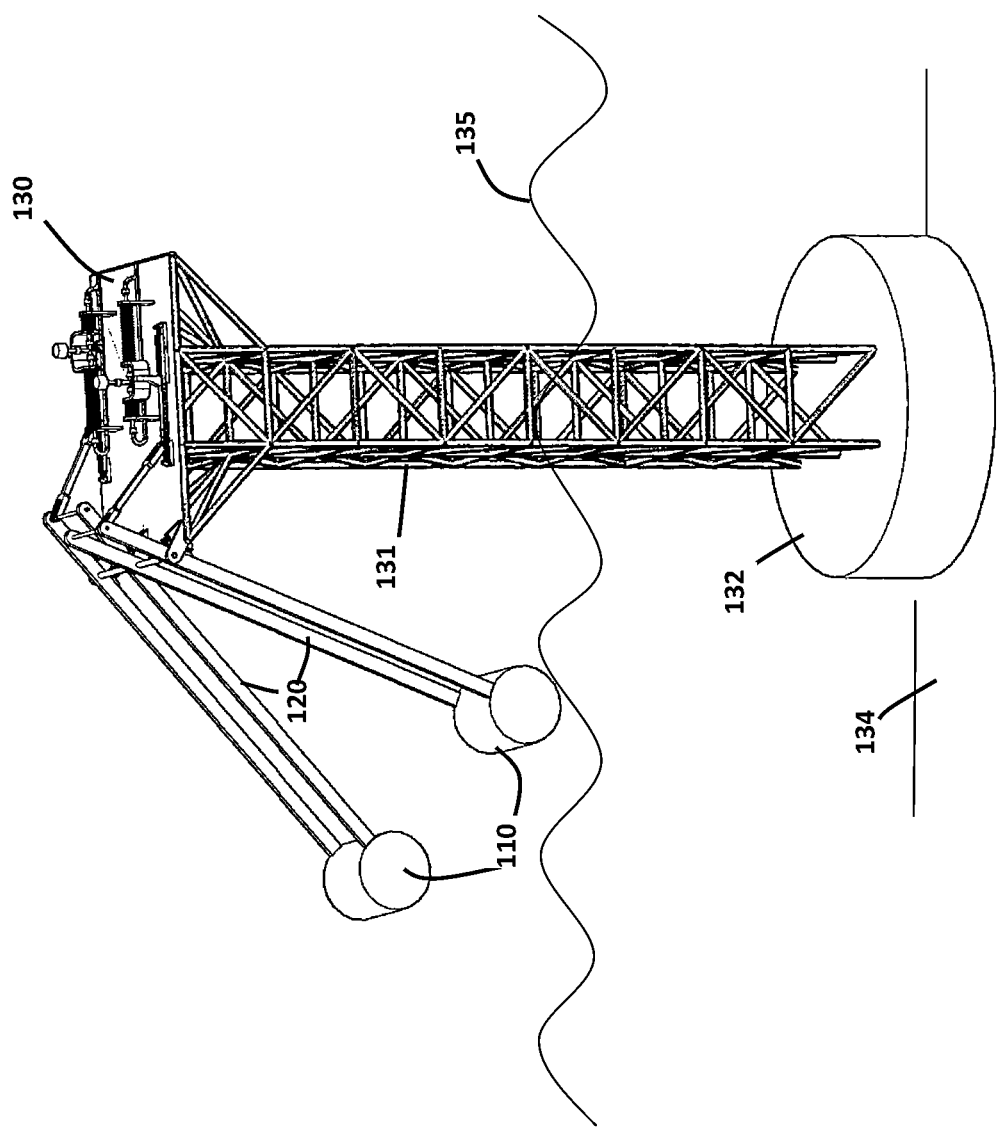
FIG. 2 illustrates an off-shore buoy type wave energy transformer platform having two transmission arms.
Figure 3:
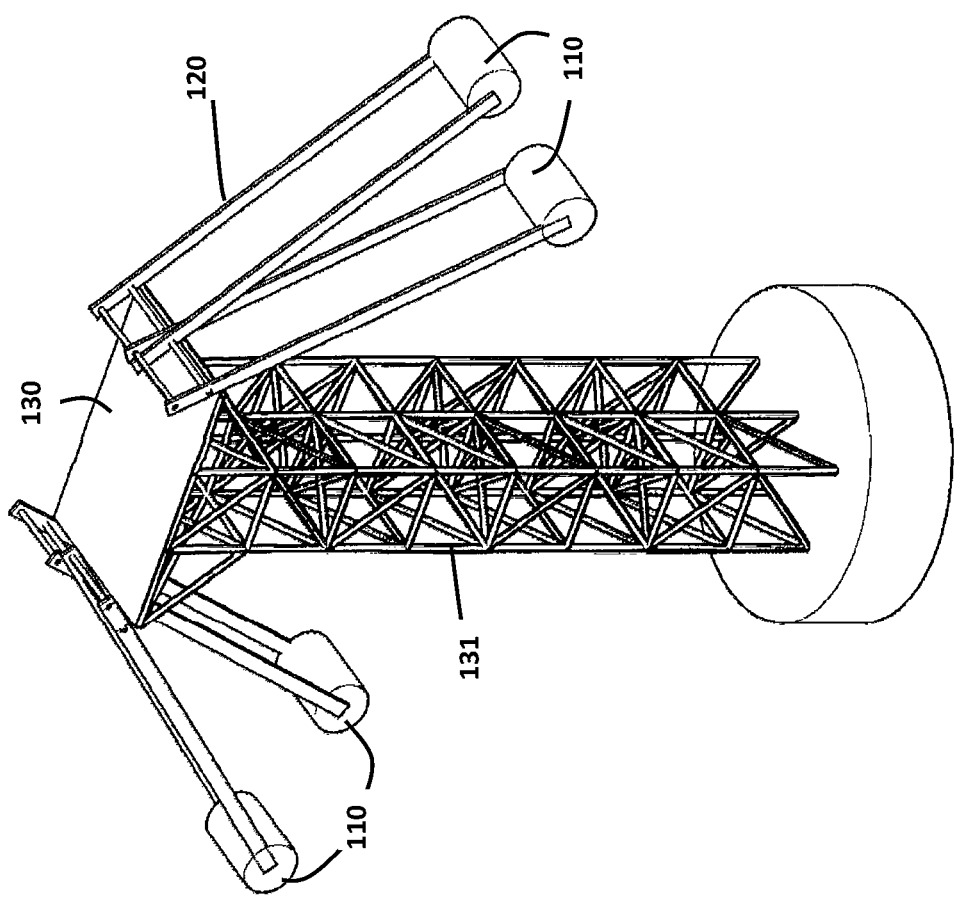
FIG. 3 illustrates an off-shore buoy type wave energy transformer platform having four transmission arms.

A preferred ocean wave energy transformer (OWET) is illustrated in FIG. 2, in which a buoy type wave energy transformer is used. In this system, an elevated platform or rig 130 is installed offshore and supported from an ocean bed 134 by a plurality of pillars or posts 131. The rig has a lower platform 132 installed on the bottom of the ocean 134. This type of OWET comprises of multiplicity of floating cylinders or buoys 110 each connected to one or more ocean water movement transmission arms 120. FIG. 2 illustrates a two buoys platform, whereas FIG. 3 illustrates a four buoys platform. Any number of buoy system can be constructed depending on the size of the platform. Platforms are located above the water surface, such that the floating cylinders move with the ocean wave undulation 135.

Figure 4:
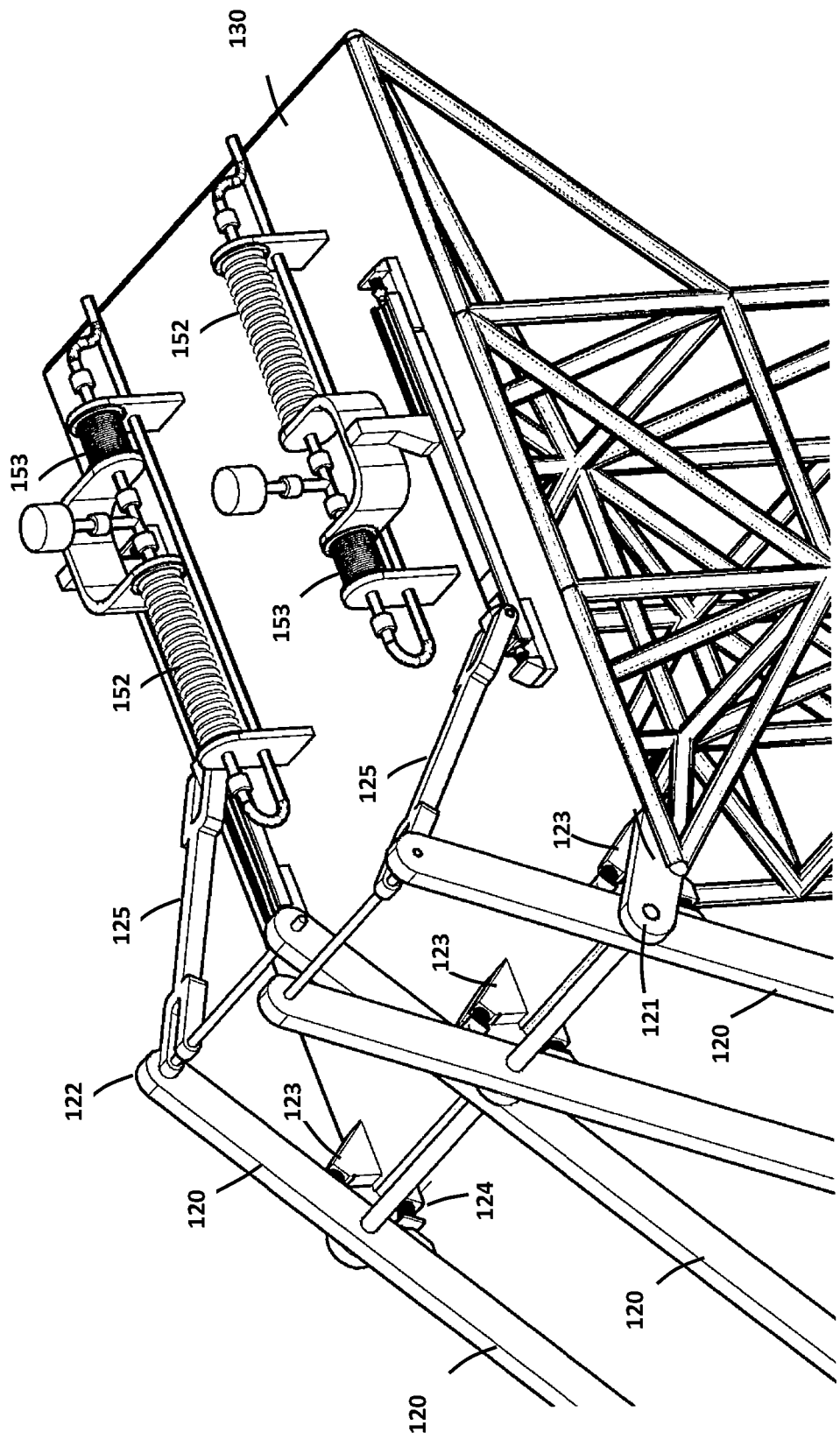
FIG. 4 illustrates a perspective view of the off-shore platform for ocean wave energy transformer (OWET)
Figure 5:
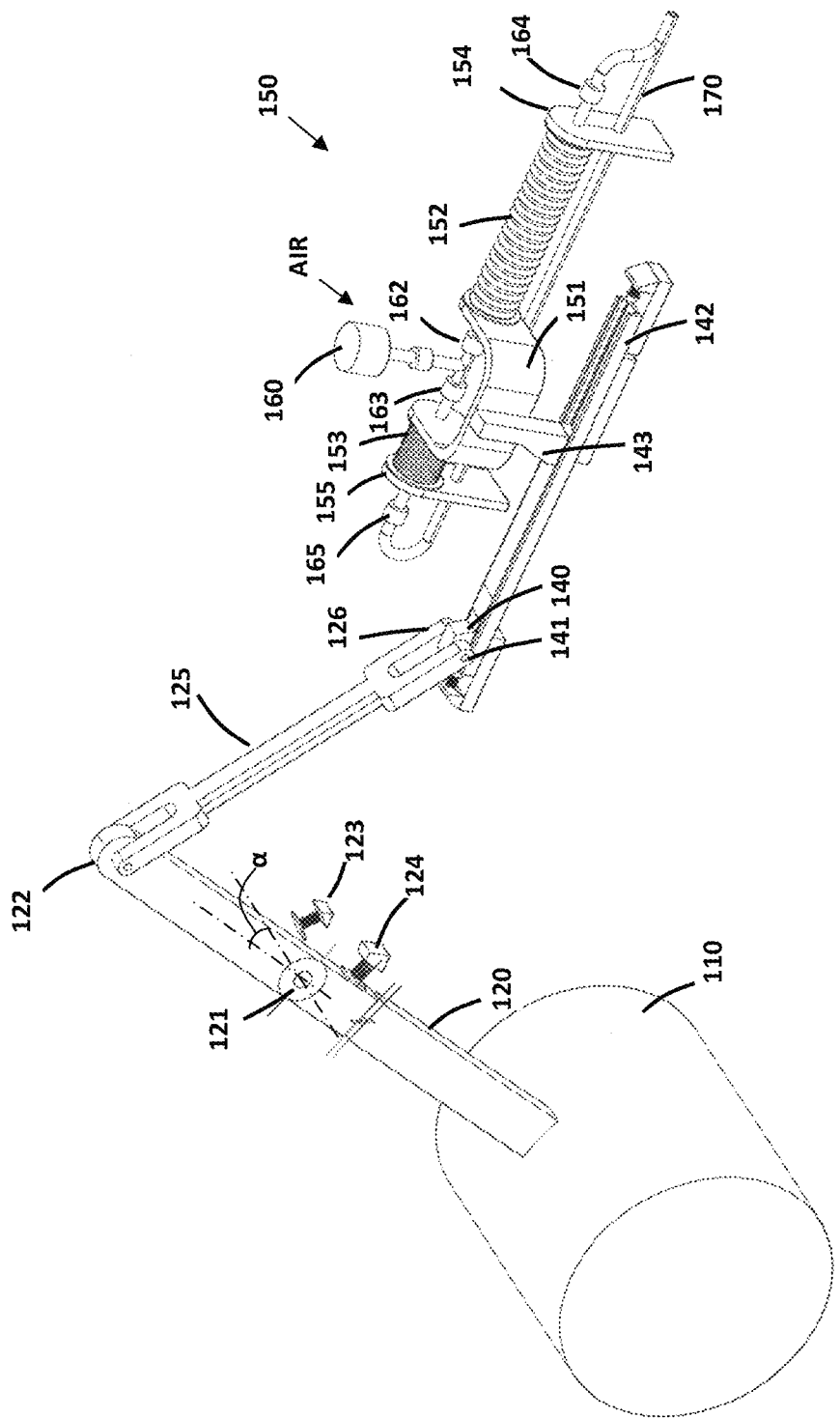
FIG. 5 illustrates a perspective view of an air compressor system utilized in OWET.

FIGS. 4 and 5 illustrate the structure of the preferred mechanism utilized to convert the wave motion to compress air. Transmission arms 120 are rotatably connected to the platform 130 at pivotal points 121. The pivot point is located at a certain distance from the upper end of the arm 122, thereby dividing the ocean water transmission arm into the upper part and a lower part. The lower end of the transmission arm is connected to a floating cylinder 110. Therefore, as the waves move the cylinder or buoy, the arm 120 goes through an angular motion. In order to limit the motion of the transmission arms to certain angle, α (Alfa), two stoppers are used. The upper transmission arm stopper 123 limits the forward motion of the upper part of the arm, and the lower transmission arm stopper 124 limits the forward motion of the lower part. The two stoppers are fixed to the platform 130. Thereby, the motion of the arm is limited by the two stoppers. The second end of each arm 122 is pivotably connected to an Alfa transmission arm 125. Alfa transmission arms are smaller arms, which transfer the rotary motion of the buoy arms to a longitudinal motion. This is achieved by connecting the second end 126 of each of the Alfa transmit arm 125 to a longitudinal transmission slider 140. Alfa arms are pivotably connected to the longitudinal slider at 141. The slider 141 is housed in a railing 142 to limit the motion only to a back and forth longitudinal motion. Therefore as the buoy is moved by the water waves, the arm 120 goes through a back and forth angular motion. This angular motion is transferred to the second angular motion of the Alfa arm 125, which provides a longitudinal motion in the slider 140, which is located inside a railing 142.

The longitudinal transmission slider 140 operates a compressor 150. Each compressor comprises of a U-shaped support 151, which is connected to the longitudinal transmission slider 140 through a support rod 143. The U-shape support 151 is connected to a twin compressor system 152 and 153.

These compressors are each fixed on one end 154 and 155, respectively, onto the platform, while their other end is connected to the U-shaped support. As the U-shaped support moves back and forth in a longitudinal motion, one compressor 152 extends, sucking outside air in, while the other compressor 153 is pushed inward, compressing its air content. A series of one-way valves, control the compression process. As compressor one 152 is extended, air is brought in the compressor 152 through an air filter 160 and a one way valve 162. The one way valve 164 does not allow the air to exit the compressor until the air pressure reaches a set value. At the same time, the air inside compressor two 153 is compressed to a pre-determined pressure, after which one way valve 165 is opened to allow compressed air to leave. On each stroke of the longitudinal transmission shaft, one of the compressors compresses its containing air. Consequently, the back and forth motion of the longitudinal arm shaft generates compressed air. The compressed air is collected from the two compressors and carried out of the system through piping 170.

Compressed air can be generated using any other type of air compressor which utilizes a shaft motion. For instance, instead of the below type of compressor disclosed above, a piston type of air compressor with one way valve can be used. In this type of compressors, the back and forth movement of a slider is directly transferred to a back and forth movement of a piston in a cylinder. Set of one-way valves fill the cylinder during one stroke and compress the air in the second stroke.

Figure 7:
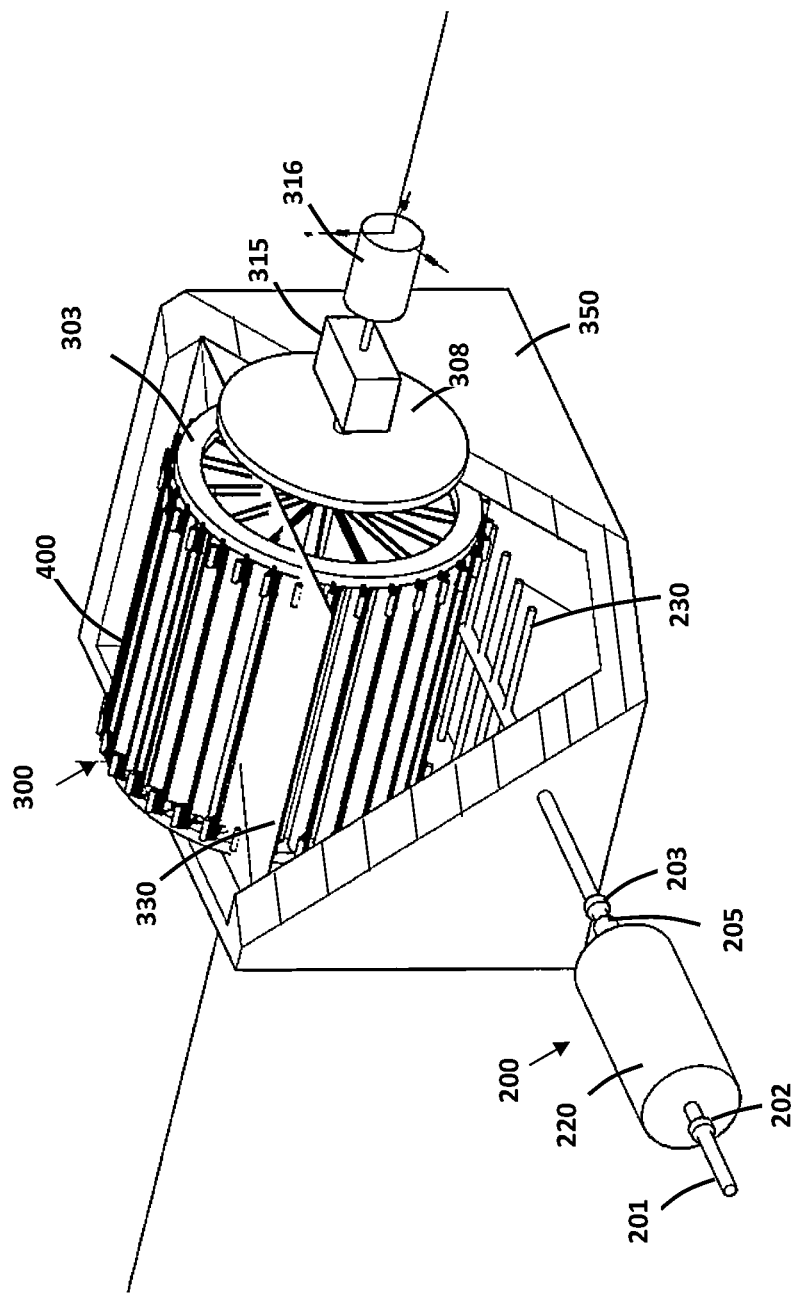
FIG. 7 illustrates a perspective view of the on-shore power plant with part of the reservoir cutout to illustrate inner parts of the system.
Figure 8:
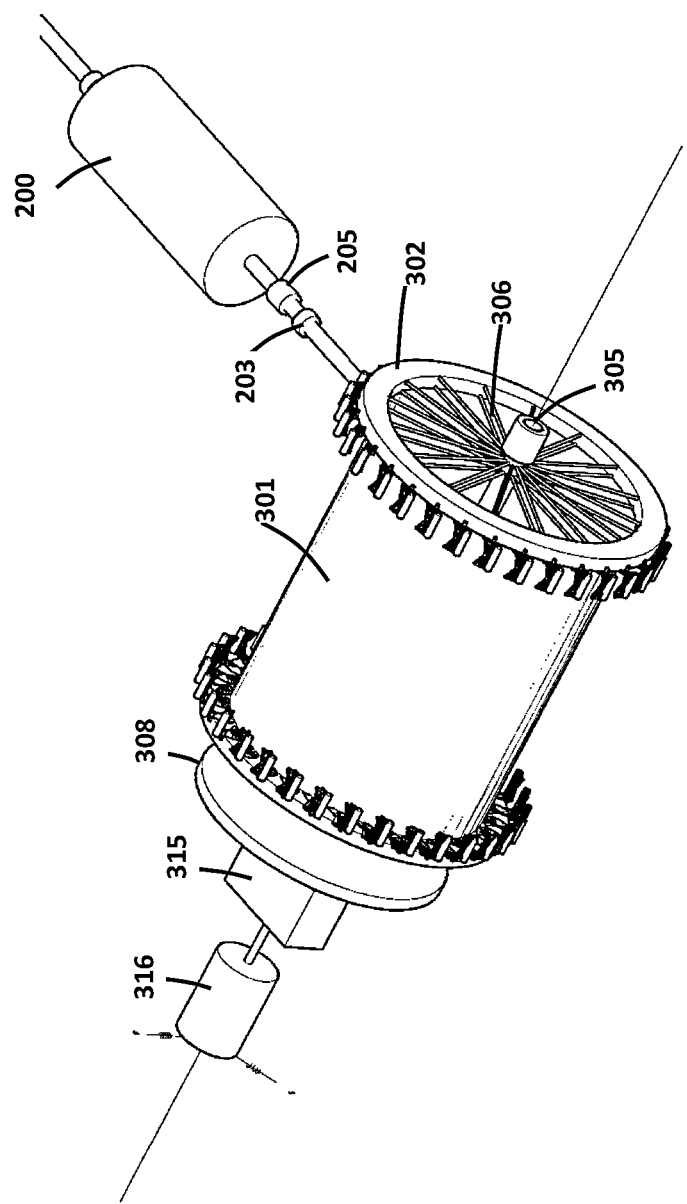
FIG. 8 illustrates the main cylindrical shell of the air-wheel without the receptacles.

Compressed air generated by all of the small air compressors are carried to one or several large compressed air tanks 200 as illustrated in FIGS. 6 and 7. The compressed air tanks act as the energy reservoirs. Compressed air from each OWET is brought from the offshore into the plant and to the compressed air tank through a piping network 201 having a one way valve 202 as illustrated in FIGS. 6-8. A one way air valve 203 and a pressure regulator 205 control the exit flow of the air. This prevents back flow of the gas to the OWET platforms.

Figure 9:
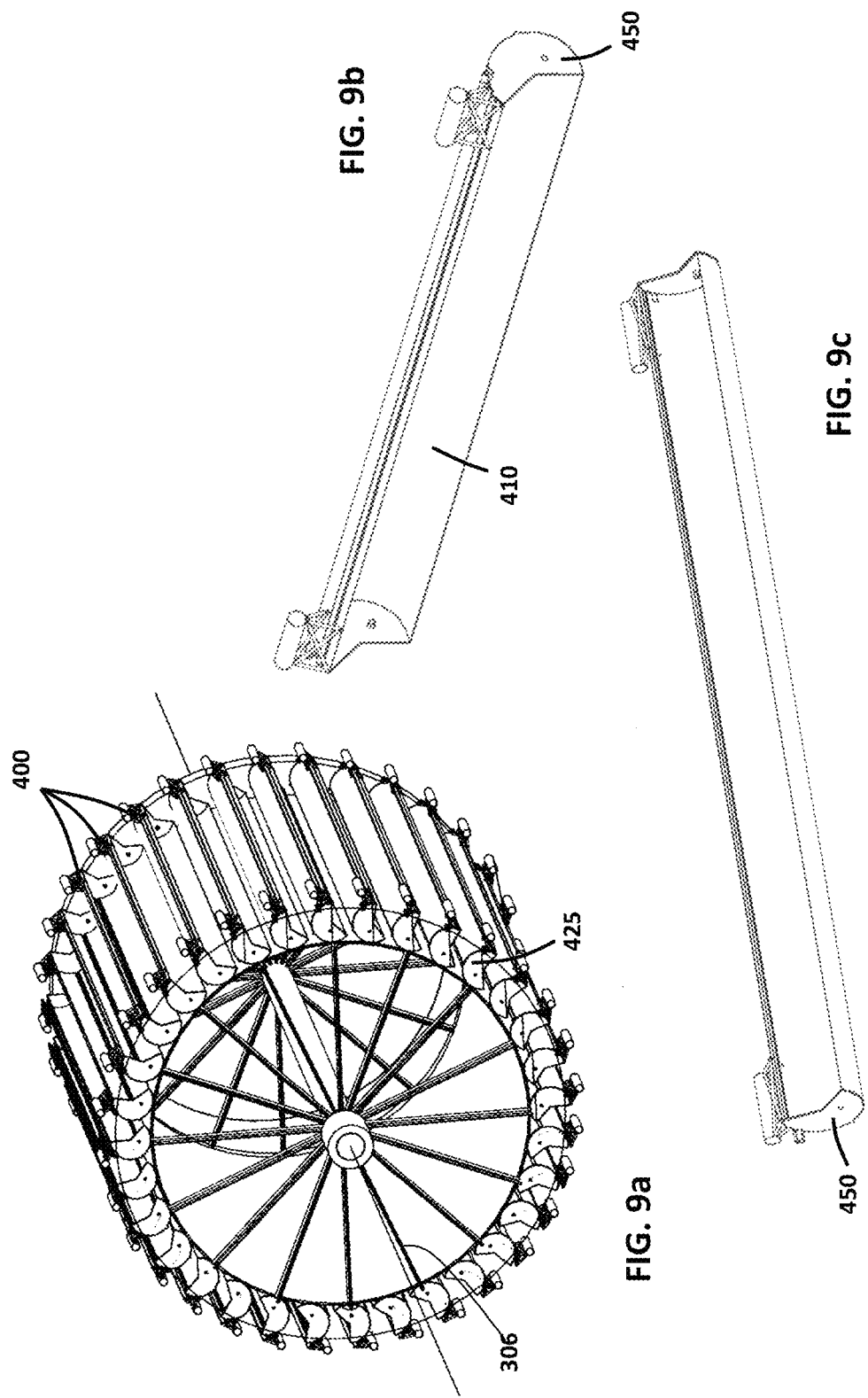
FIG. 9 illustrates the receptacles of the air-wheel (a) as assembled, (b) and (c) two perspectives of each receptacle.
Figure 10:
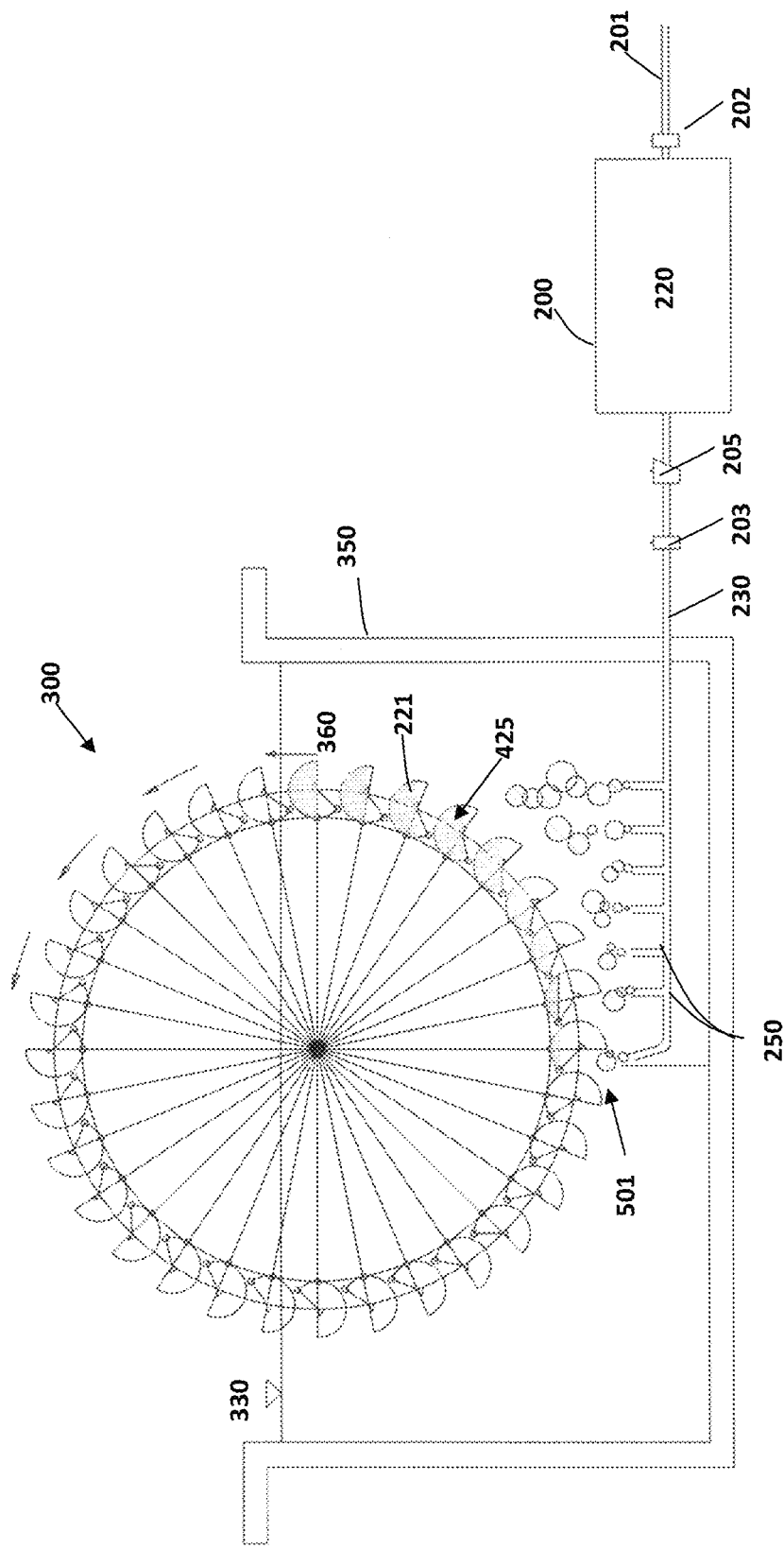
FIG. 10 illustrates a cross sectional side view of the on-shore power plant and the process of filling of the receptacles with air.

FIGS. 6-10 illustrate the onshore power plant, which comprises of a large airwheel system 300 located inside a liquid reservoir 350 which is deep enough to receive the air-wheel. The upper part of the air wheel sticks out of the liquid reservoir, which has a certain liquid level 330. The air-wheel, as described here, is inverse of a water wheel, whereas air is the working fluid, rather than water. The buoyancy of the air in water moves the wheel. Although, other buoyancy driven devices can be used, the preferred embodiment uses an air-wheel system. The momentum is needed to run a gear system to generate a high rpm shaft motion for power generation. The shaft 305 goes through the reservoir 350 and it is sealed by bearings 311 and 312. The shaft is connected to a flywheel 308, preferably located outside of the reservoir, to store the angular momentum of the air-wheel. The torque in the flywheel is then taken to a gear box 315 to increase the rpm. The high speed rpm of a shaft out of the gear box in then taken to a turbine 316 to generate power. The high pressure air 220 stored in the high pressure air tank 200 is then taken to the lower part of the liquid reservoir and below the air-wheel 300 as illustrated in FIG. 7. The air is then released through a series of pipes 230 having nozzles 250 (as illustrated in FIG. 10) into the rotating receptacles 400 of the air-wheel (as illustrated in FIGS. 7 and 9). FIG. 10 shows that as each receptacle passes by the air release zone, it is filled with air 221. The buoyancy force due to the density difference between the air and the liquid inside the reservoir results in an upward force 360, moving the air-wheel. The shape and the size of the receptacles can be changed depending on the size of the air-wheel.

The air-wheel of the preferred device is illustrated in FIGS. 6-19. FIG. 7 illustrates the complete air wheel and FIGS. 8-19 show details of the system. This wheel comprises of a longitudinally extended cylindrical shell 301 as illustrated in FIG. 8, which has two outer wheel rings, front wheel ring 302 and the back wheel ring 303, connected to the two ends of the cylindrical shell 301, forming a reel or rim like system. Extending between the two wheels are multiplicity of receptacles 400, as illustrated in FIG. 9. In this figure the front wheel ring is not shown, so that the receptacles are clearly seen. These receptacles are incomplete cylindrical sections having a circular segment cross sectional shape. The circular segments are slightly less than ⅔ of a circle. The two ends of the cylindrical segments are closed using cave caps, thus the inside of the cylindrical segment forming a cave to hold the air. The wheel rings and the cylindrical shell being connected to a central shaft 305 through multiplicity of supporting rods 306.

Figure 11:
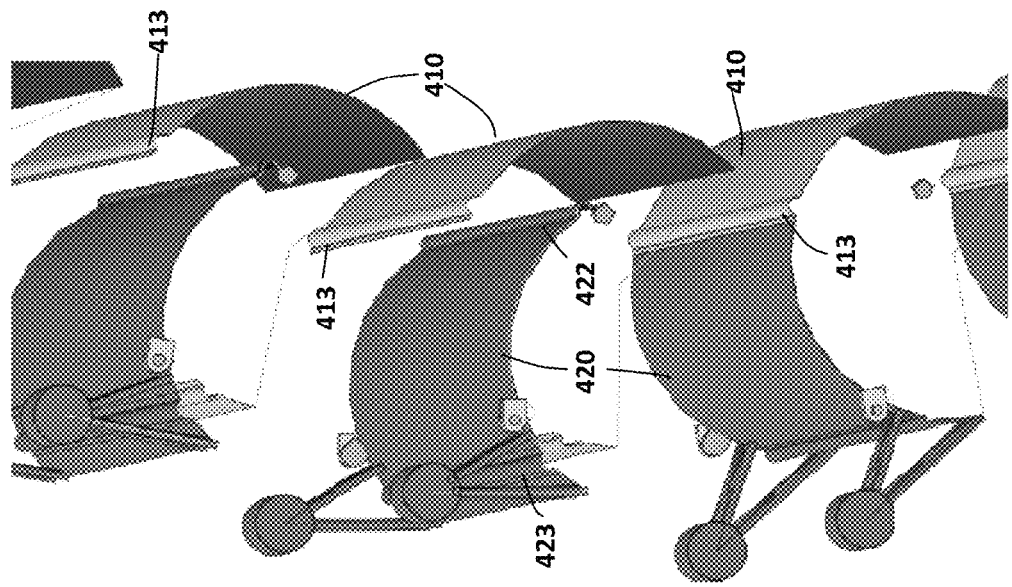
FIG. 11 illustrates different parts of a receptacle showing the fixed part and the damper and their method of attachment.
Figure 12:
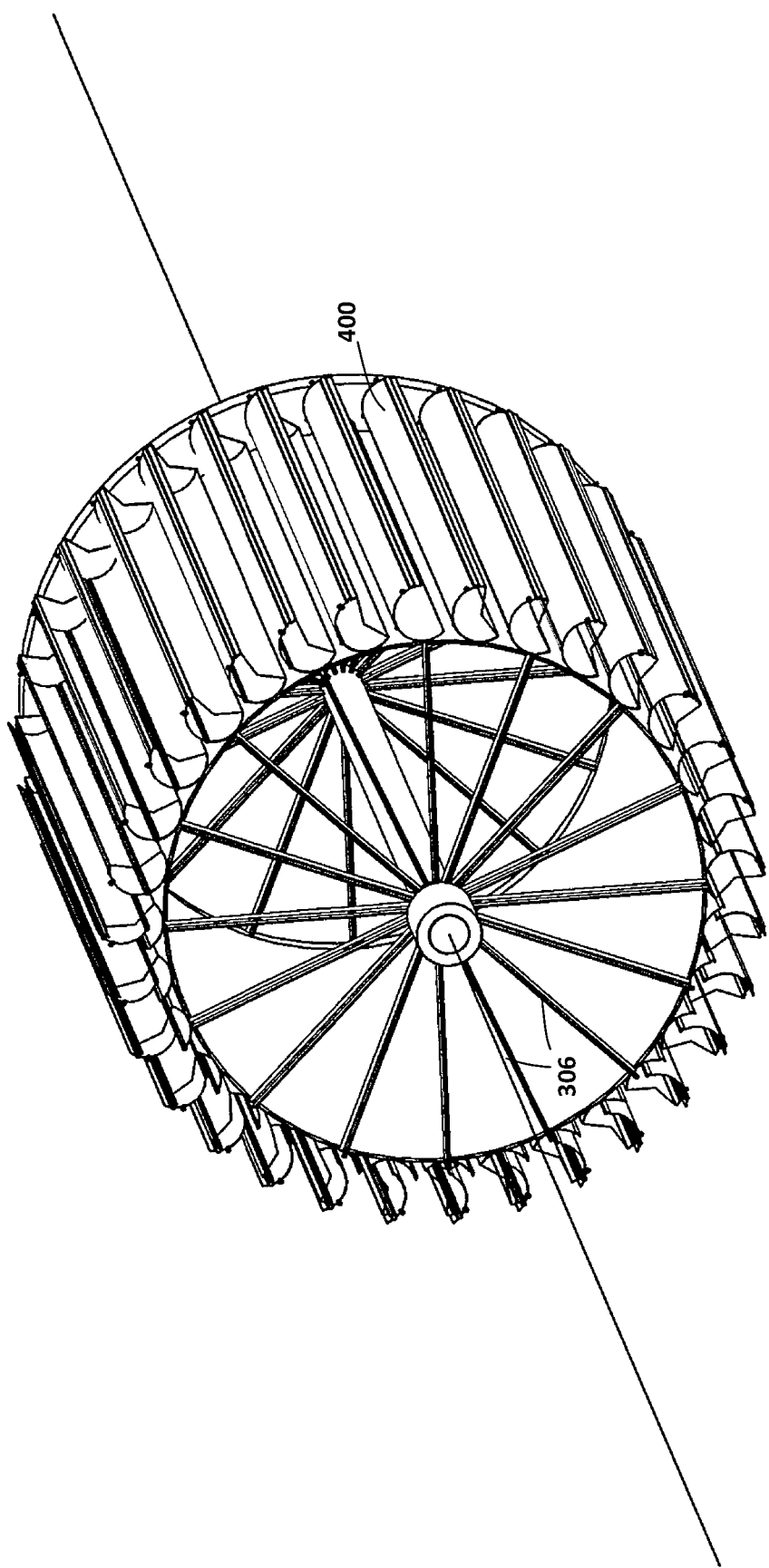
FIG. 12 illustrates the fixed part of the receptacles as positioned on the air wheel.
Figure 13:
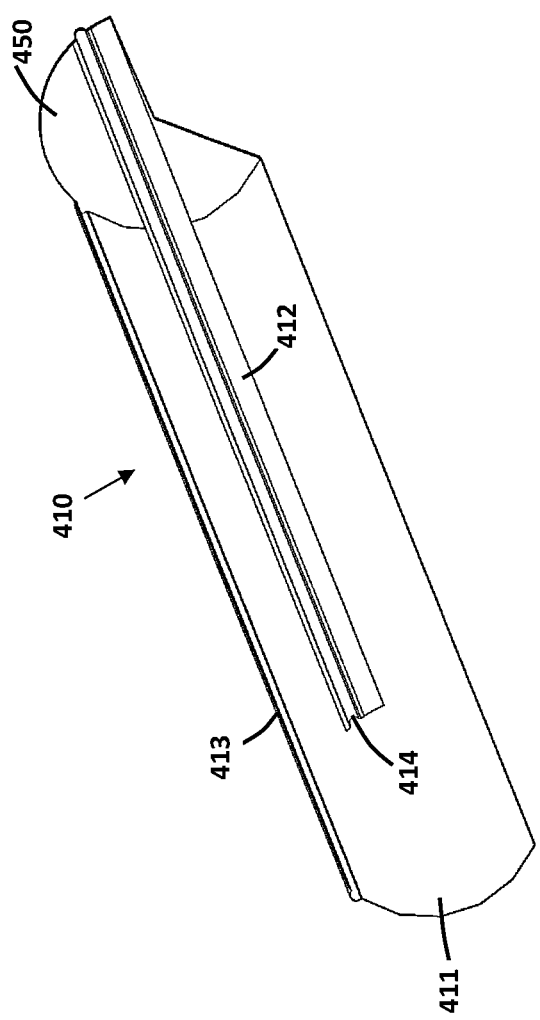
FIG. 13 illustrates the fixed part of a receptacle.
Figure 14:
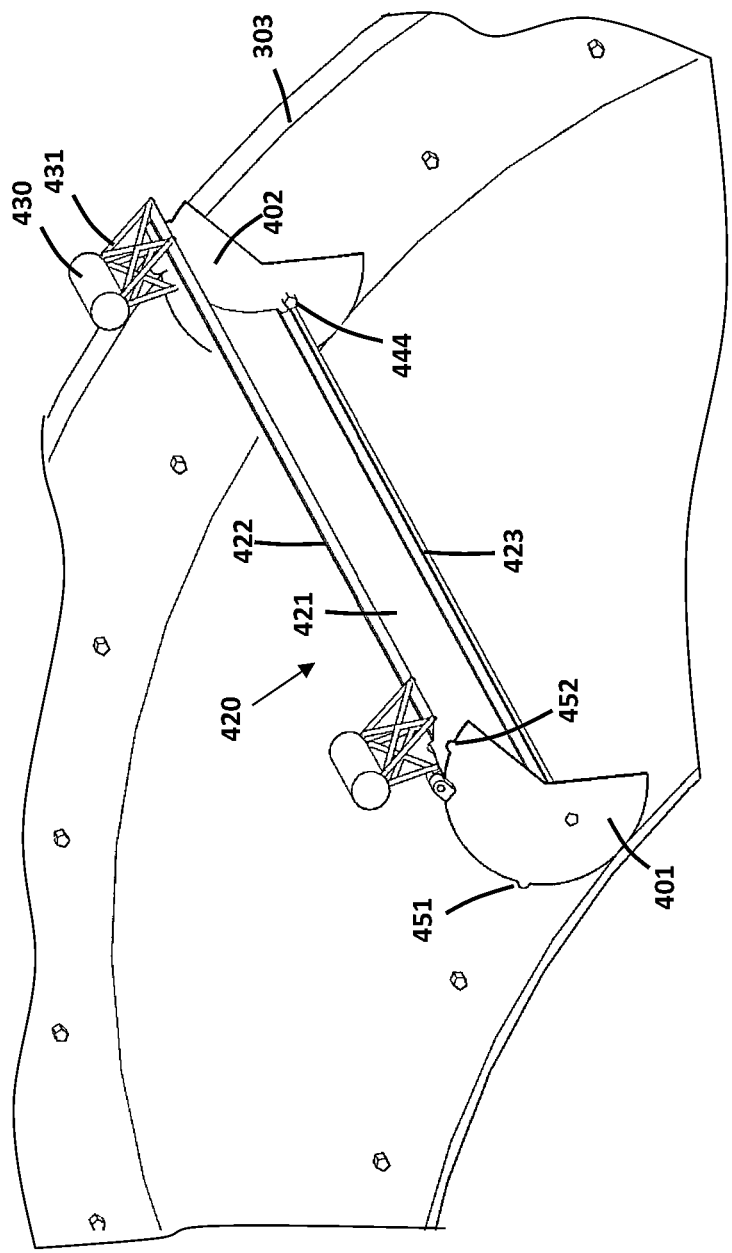
FIG. 14 illustrates the damper part of a receptacle as connected to cave caps.
Figure 15:
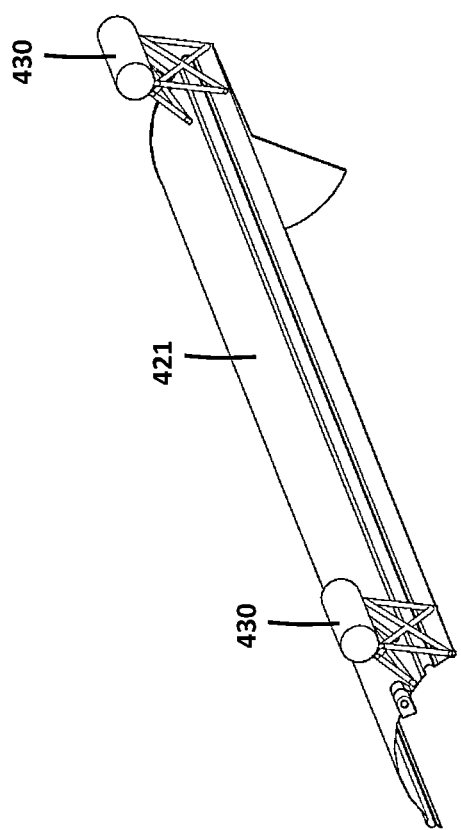
FIG. 15 illustrates the damper part of a receptacle.
Figure 16:
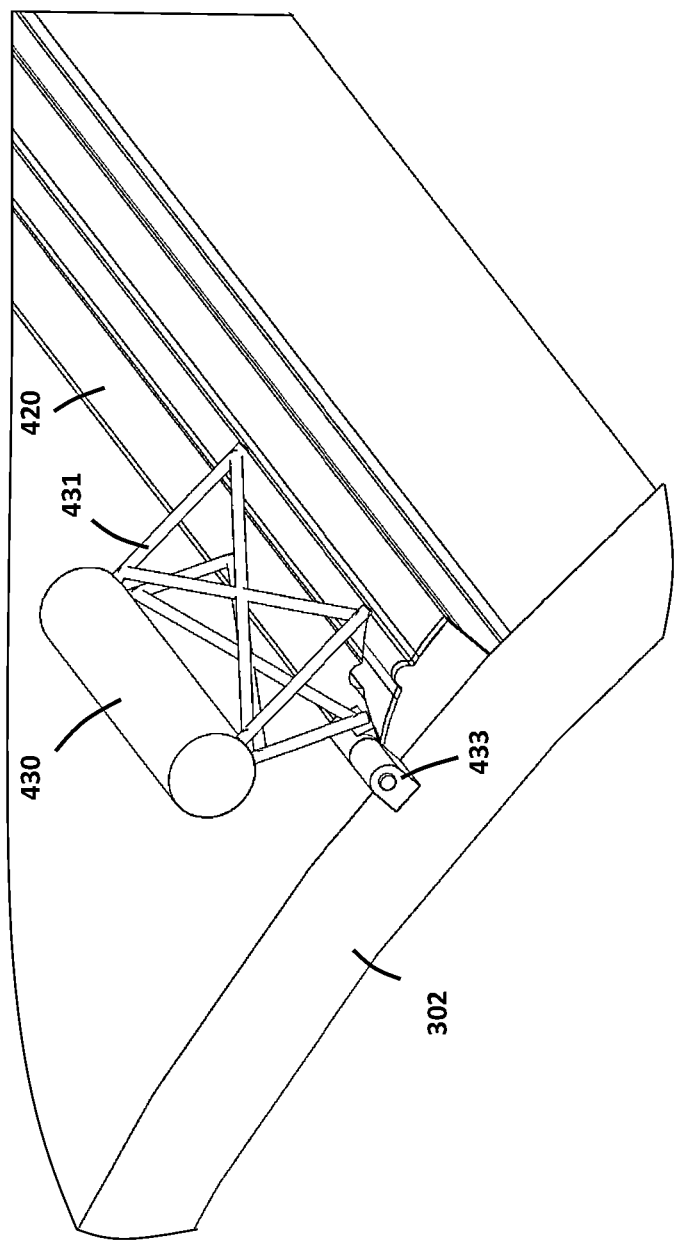
FIG. 16 illustrates the connection point of a damper to a wheel ring.
Figure 17:
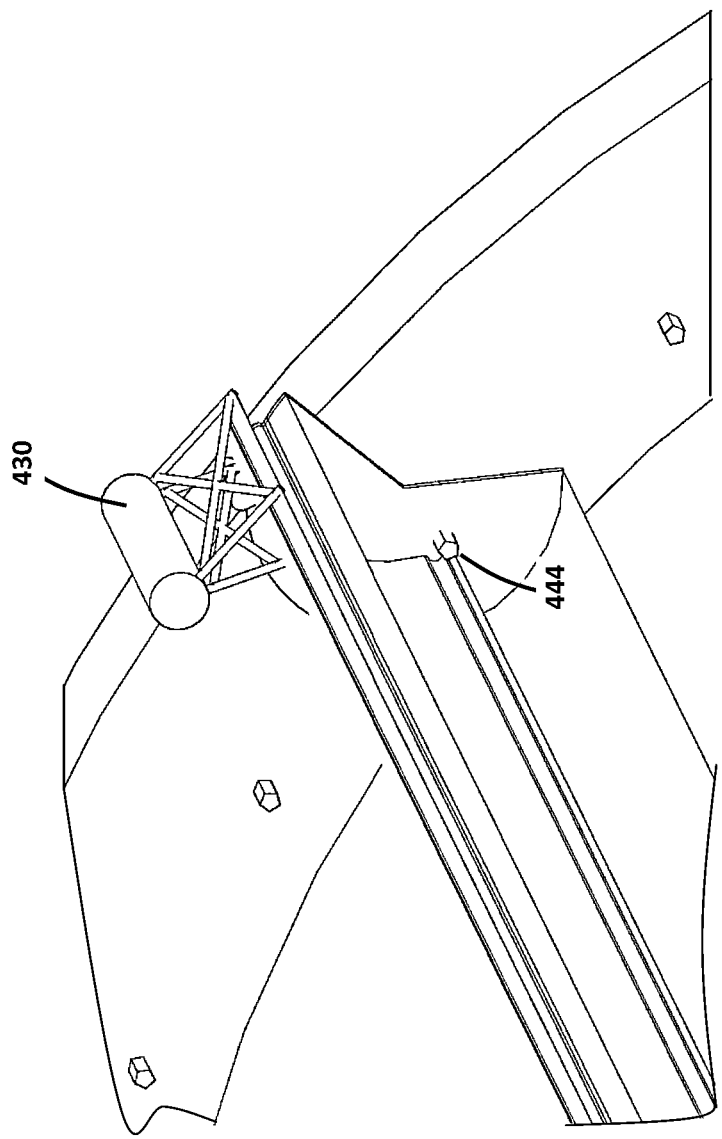
FIG. 17 illustrates a damper in fully open position as it reaches to a stopper.
Figure 18:
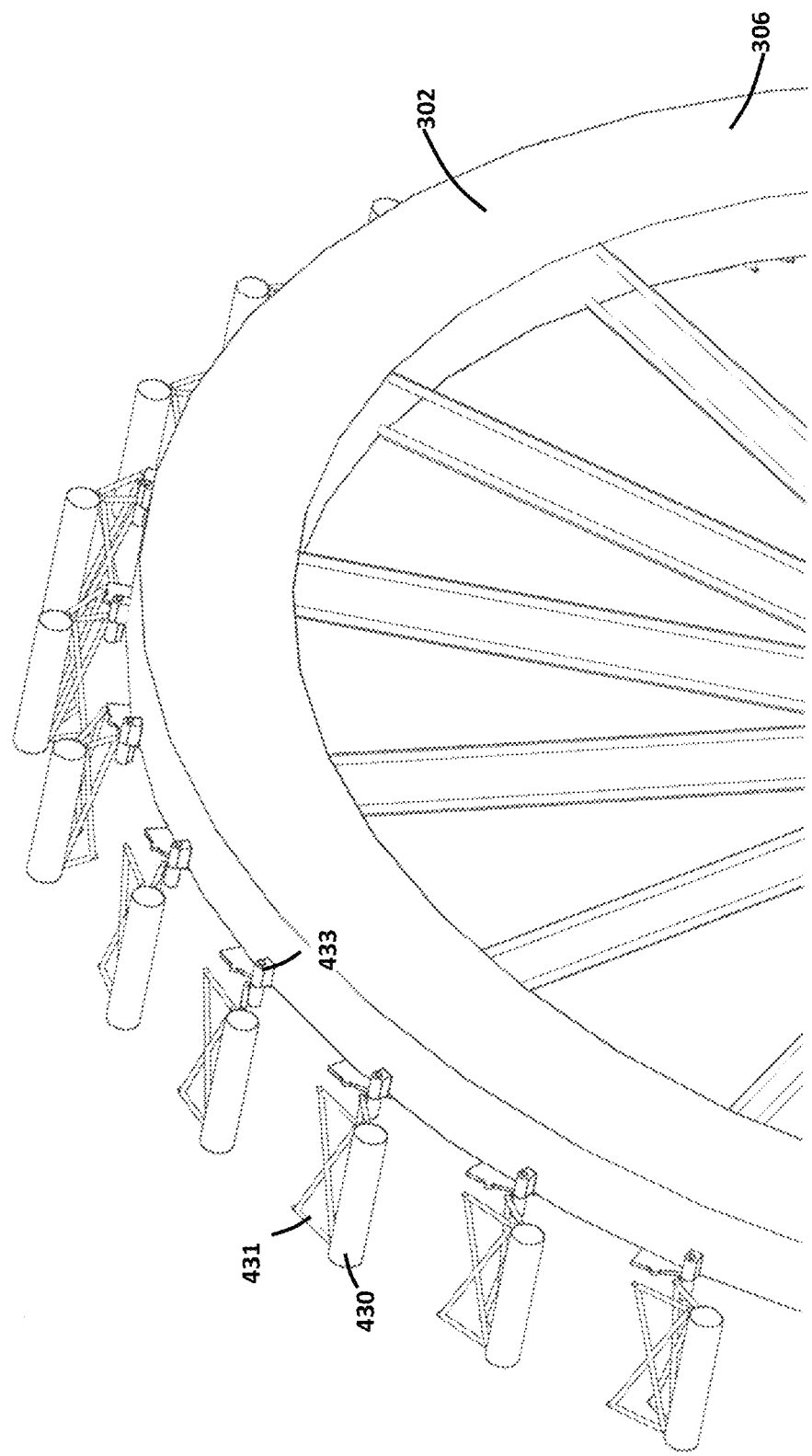
FIG. 18 illustrates the connection of the dampers on a wheel ring.

Receptacles are designed to capture the compressed air at the bottom of the reservoir, release the air at the top of the reservoir, and fill the receptacle with water on the way down as illustrated in FIG. 10. The preferred receptacle design comprise of two parts as illustrated in FIGS. 11 and 12: A fixed part 410 as in FIG. 13, and a moveable damper 420 as in FIG. 14. The fixed part 410 (FIG. 13 illustrates only half of a receptacle) has two cave caps 450, on each side, which are fixed to the wheel rings 302 and 303. The fixed part comprises of a larger section 411 and a smaller section 412. The larger section extending between the two end caps has a deformation 413 to tightly attach onto the damper. The smaller section 412 is connected to one end of the cave cap 450 leaving a section of cave cap open. The smaller section 412 also has a deformation 414 to tightly attach onto the damper section. The damper 420 illustrated in FIG. 14 comprises of an elongated segment 421 which spans between the two wheel rings 302 and 303 and shaped to fit between the larger 411 and smaller sections 412 of the fixed part 410. Each damper has two deformation sections 422 and 423 which locks on the deformation sections of the fixed section. The damper has two weight mechanisms 430 on each side which are connected to the damper by a series of supporting rods 431. The damper is connected to a wheel ring using a hinge 433. The weight system opens and closes the damper depending on the location of the receptacle on the wheel. FIG. 16 illustrates the mechanism of the connection of the damper to a ring. The damper 420 is connected to the wheel 302 through fixed hinges 433, which allows it to rotate.

Figure 19:
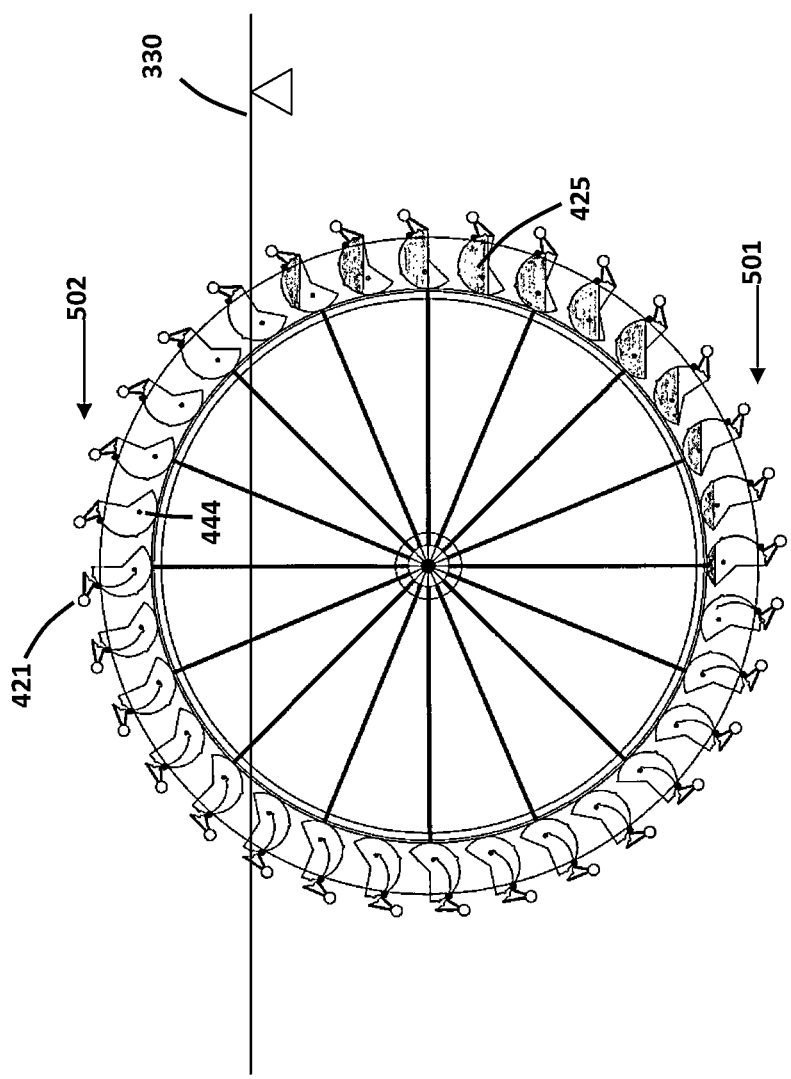
FIG. 19 illustrates a side view of the air-wheel without the wheel rings and with receptacles filled with air.
Figure 20:
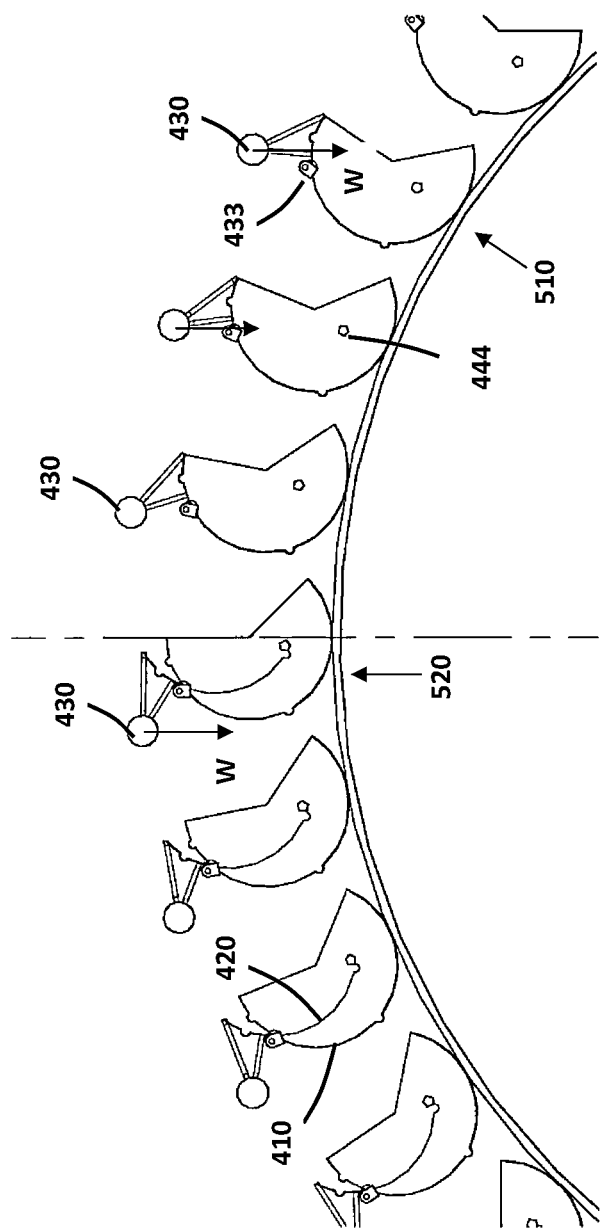
FIG. 20 illustrates the opening of the damper as the wheel turns.

Once the receptacles reach to the top of the air wheel, the two parts are separated to allow water to easily enter in the receptacle and to reduce the drag on the receptacle. FIGS. 11, 19 and 20 show how the two parts of each receptacle combine as they rotate with the air-wheel. The receptacles start the air filling process at the lower part of the wheel 501. As the receptacles move up the air is trapped in the air caves of the receptacles 425. Once the receptacles exit the water, air is released and the receptacles go through an opening process. Dampers open by the balance weights. FIG. 20 illustrates the process of the opening of the damper. Once the receptacles reach to the top of the reservoir, the air is released and the receptacle is turned. The two parts are separated from each other so that once the receptacle is entering back into the reservoir it can be easy filled with liquid. At position 510 in FIG. 20 the direction of the weight W of the balance weight 430 is on the right side of the hinge 433, forcing the damper to be in the closed position. As the receptacle turns, reaching position 520, the direction of the weight W is moved to the left side of the hinge 433, and therefore, the weight is moved down, opening the damper. A stopper 444 limits the movement of the damper. The fixed part and the damper are locked by a locking mechanism 451 and 452. The receptacles which are moving down towards the bottom of the reservoir do not have any air in them. The process of filling the receptacles with air, and consequently, forming a buoyancy force, results in the continuous motion of the air-wheel. This motion turns the air-wheel shaft which is connected to a turbine through a gear mechanism to generate electricity.

The water depth 330 of reservoir depends on the size of the air-wheel, which depends on the designed power output of the power plant. For instance, a 1.6 MWh power plant may need a water reservoir with 100 m length by 100 m width and 80 m depth. More than ¾ of the wheels of the system are immersed inside the water, whereas the top portion of the wheel is outside of the water. For a power plant that can generate 1.6 MW-hr, an air-wheel with radius of 40 m, with receptacles having a radius of about 4 m, and a length of 80 m may be used. For a wheel having 32 receptacles, nearly 12 receptacles will be partially filled with air. This is equivalent to about 8 receptacles being half filled with air. Then, the total average volume of the air in all of the filled receptacles is about 16,000 $m^3$. This volume is obtained based on the following relation: Volume=8 (receptacles)×80 m (length of the receptacles)×25 $m^2$ (semi-circular cross section of the filled receptacles). Using the density of water (1 ton/$m^3$). The momentum generated can be estimated based on the buoyancy force times the ⅞ of the radius of the air-wheel, which is the approximate location of the centeroid of the volume of receptacles. This momentum is transformed into the power, which for an air-wheel with a radius of 40 meter and having receptacles with length of 80 m comes up to be about 1.6 MW·hr. For such a power plant a tank with about 100 m (width)×100 m (length)× 80 m (height) is needed.

Figure 21:
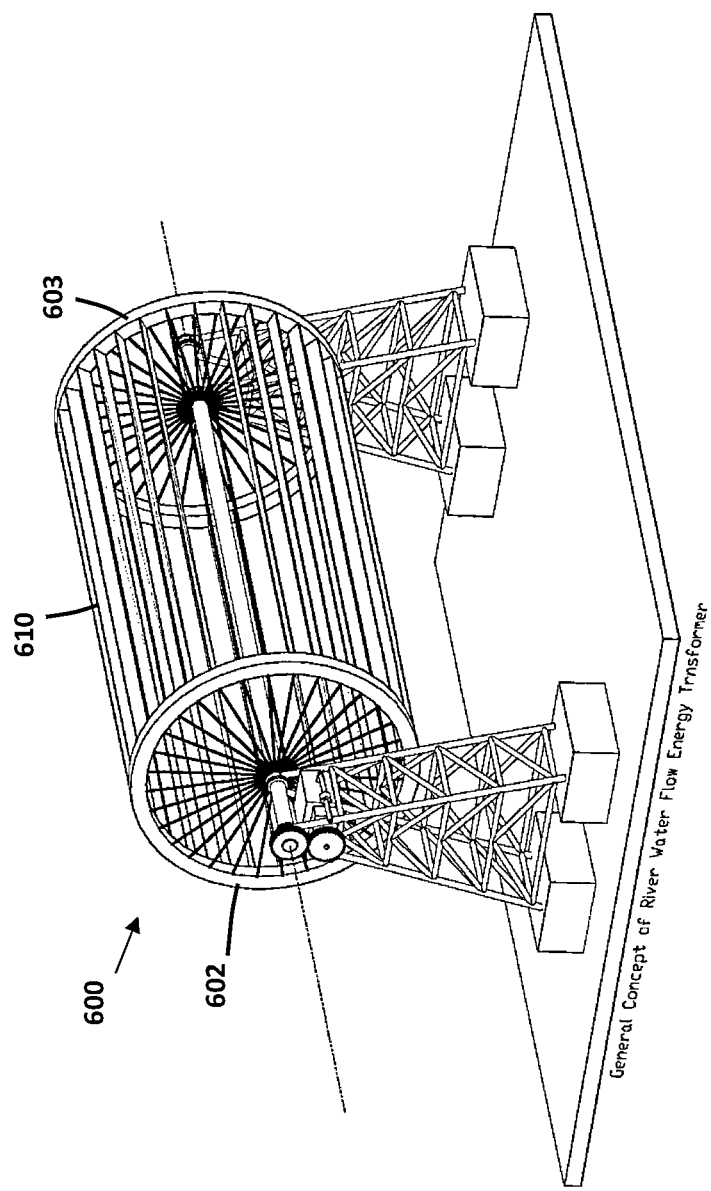
FIG. 21 illustrates a water wheel to generate compressed air from flowing waters.
Figure 22:
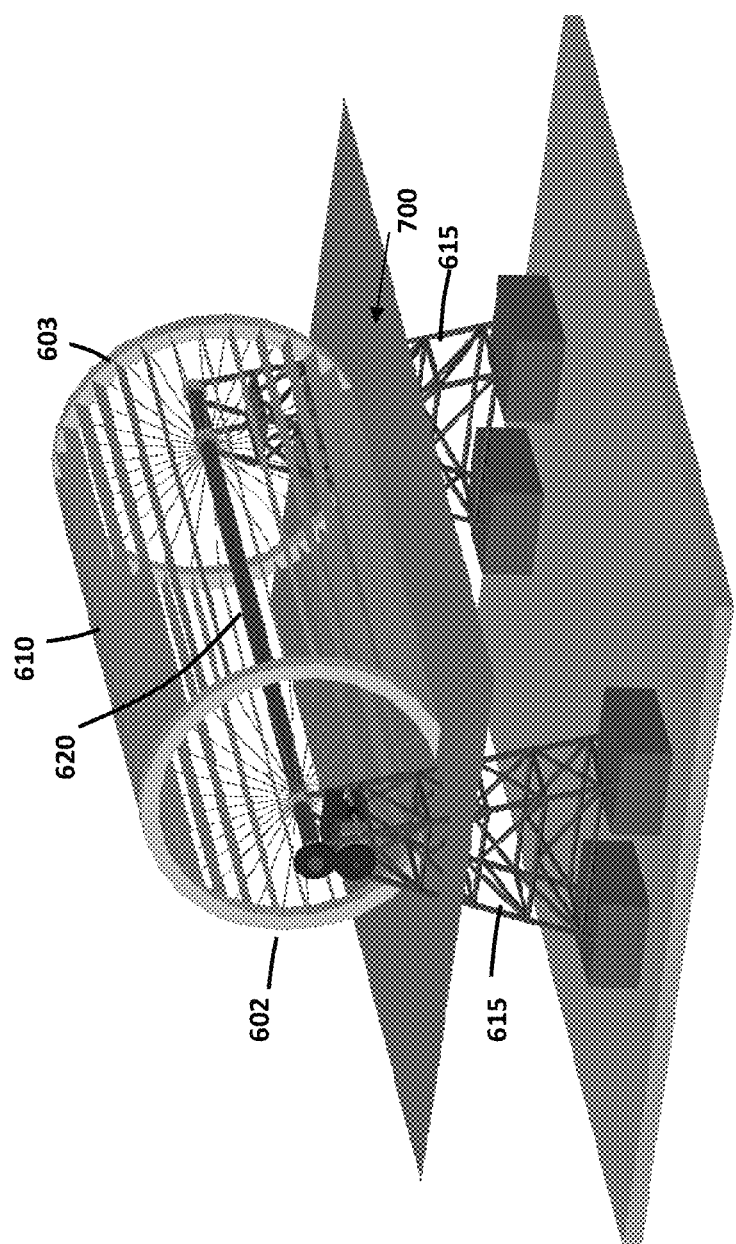
FIG. 22 illustrates a perspective view of a river or open channel water energy transformer (ROCWET)
Figure 23:
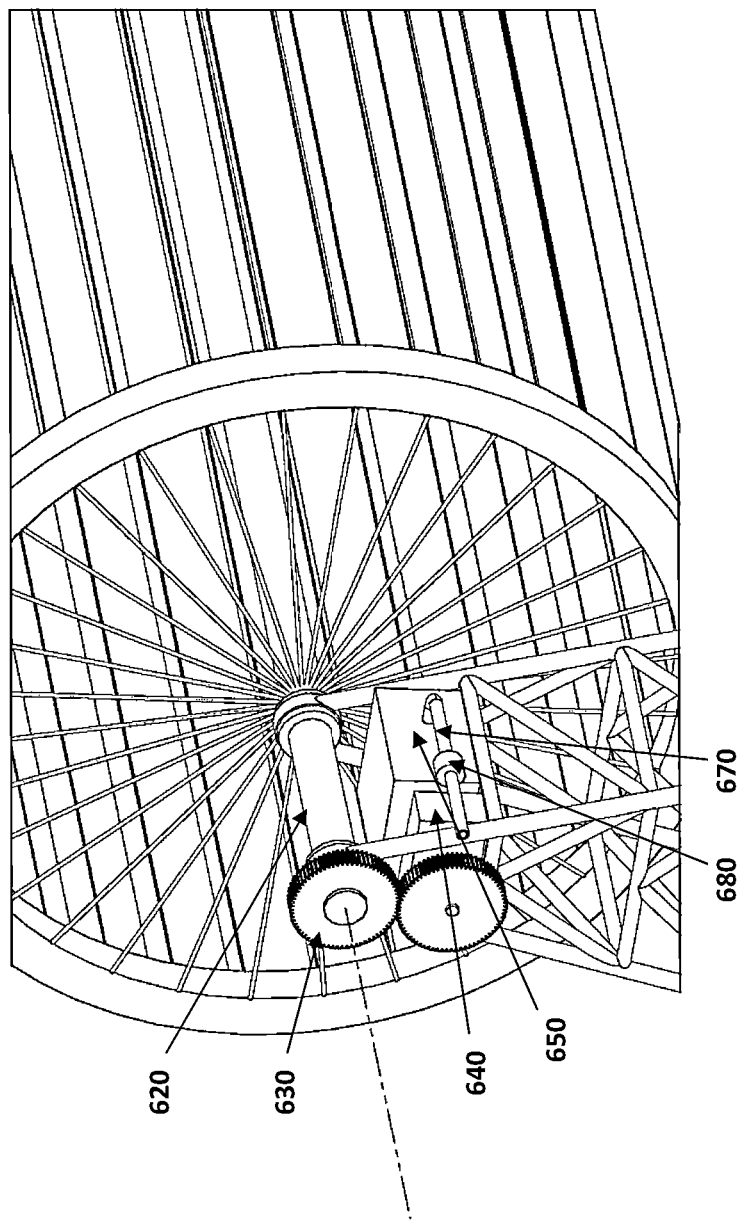
FIG. 23 illustrates a close-up view of the gear mechanism and the air compressor installed next to the water wheel.
Figure 24:
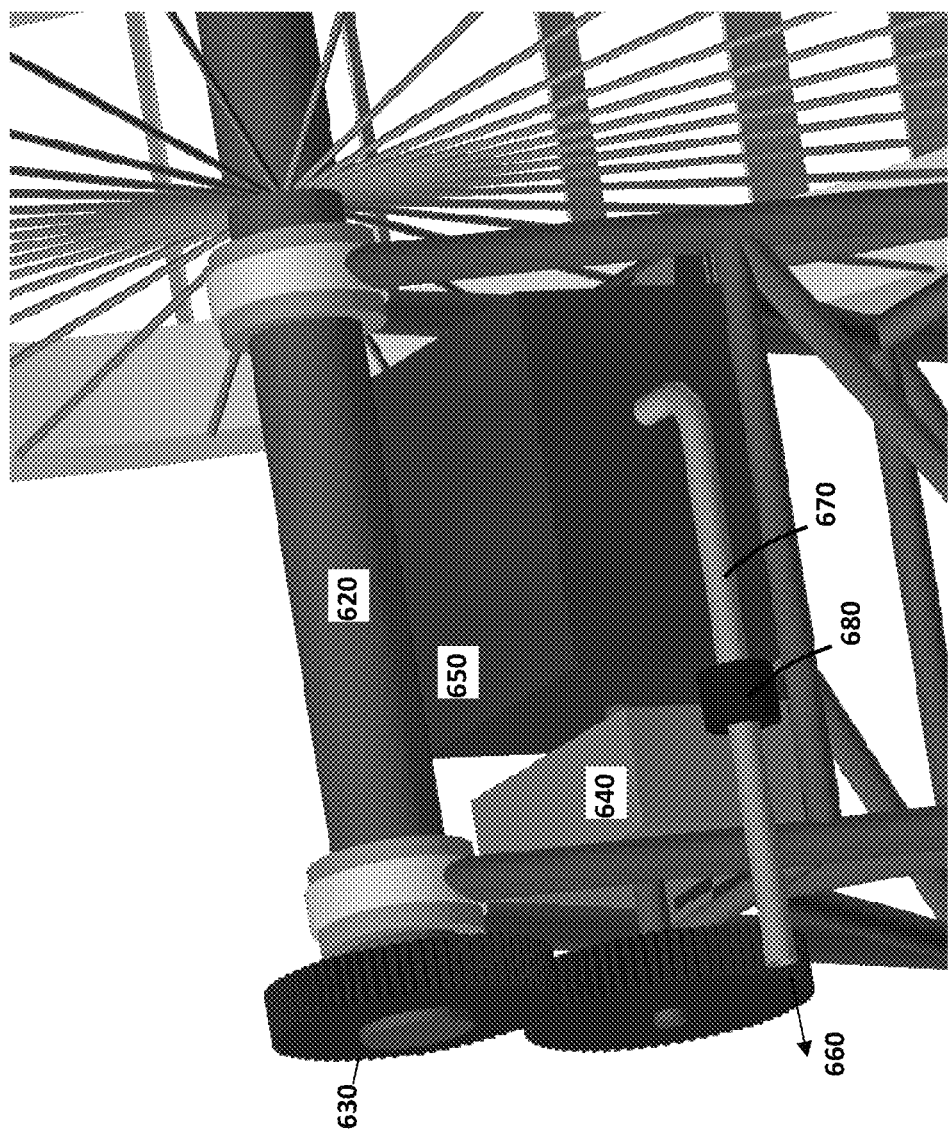
FIG. 24 is a perspective and shaded illustration of the gear system and the air compressor.

The high pressure air can also be generated using the energy content of any other naturally occurring system. For instance, in another embodiment of the same device, the energy of a flowing waters, such as a river or an open channel flow, is used to generate high pressure air. FIGS. 21 and 22 illustrate a water wheel 600 installed on a flowing water 700. Water flow turns the water wheel generating a torque. The water wheel comprises of two wheel rings 602 and 603 with multiplicity of blades 610 or vanes spanning between the two rings. The water wheel has a main central shaft 620 which is supported by two structures 615 installed along the water flow path.

The main shaft 620 is connected to a main shaft torque transmission gear 630, which is then connected to a gear box 640 for conversion of the central shaft energy to the compressor 650. Compressed air 660 is then taken to a compressed air reservoir through a piping 670 having a one valve 680. The compressed air so generated is then taken to the on-shore reservoir as discussed earlier.

Although the disclosure describes and illustrates preferred embodiments of the invention, it is to be understood that the invention is not limited to these particular embodiments. Many variations and modifications will now occur to those skilled in the art.

What is claimed is:

1. A green power generation system using multiplicity of ocean wave energy or flowing water energy transformers with limited environmental impact to produce compressed air, said system comprising:
   a. multiplicity of off-shore water wave or flowing water energy transformers, each transformer generating a mechanical work;
   b. multiplicity of air compressors to utilize said mechanical work from each said transformer to generate compressed air;
   c. at least one compressed air reservoir to collect and store all compressed airs generated by said air compressors;
   d. an air wheel system having a diameter and length;
   e. means to controllably deliver the compressed air from said compressed air tank to the air wheel system, thereby generating a buoyancy force to rotate the air wheel; and
   f. means to convert said rotation of the air wheel to power, wherein said air wheel system comprising:
   a. a liquid reservoir having side walls, and a bottom, forming an inside space to hold a liquid, said reservoir being substantially filled with a liquid;
   b. an air wheel having a central shaft installed inside the reservoir, said shaft having a first and a second end, said ends supported by two opposing walls of the reservoir using liquid sealed bearing mechanism, whereby said central shaft can rotate while supported by the reservoir walls without liquid leakage;
   c. said air wheel having a first and a second wheel rings concentrically attached to the central shaft using multiplicity of supporting rods, said rings having an inner side and outer side, the outer sides facing the reservoir walls;
   d. a cylindrical shell extending between the two wheel rings;
   e. multiplicity of receptacles extending between the two wheel rings and connected to the inner sides of the wheel rings and resting circumferentially on the cylindrical shell to capture and hold air;
   f. said air wheel being substantially immersed inside the liquid, wherein the top part of the air-wheel remaining outside of the liquid;
   g. an air dispensing means at the bottom of the reservoir, whereby the compressed air being released below the air wheel to fill the receptacles, whereby said receptacles rotating by the buoyancy force generated by the air filled receptacles, and thereby, rotating the central shaft; and
   wherein each said receptacle comprising:
   a. a fixed curved segment having a damper with means to open and close, said curved segment forming a cave of cylindrical section to entrap air when the damper being closed;
   b. said fixed curved segment extending between the two wheel rings and having two cave caps, each said cave cap connected to inner wall of each said wheel ring.

2. The green air-wheel system of claim 1, wherein at least ¾ of the diameter of the air-wheel being immersed inside the liquid in the reservoir.

3. The green air wheel system of claim 1, wherein each said receptacle further comprises:
   a. said damper being rotatably connected to said wheels through a hinge mechanism;
   b. said means to open and close the damper comprising a balancing weight means to open the damper when the receptacle being reached to the top of the reservoir and to close the damper when the receptacle being reached close to the bottom of the reservoir;
   c. said fixed curved segment and said damper having surface deformations to latch onto each other and to seal the receptacle when the damper being in closed position; and
   d. said cave caps having stoppers to limit the opening range of the damper, whereby the damper remaining in closed position while the receptacle moving from bottom of the reservoir to the top of the reservoir and in open position when the receptacle moving from the top of the reservoir to the bottom of the reservoir, thereby preventing air entrapment and reducing drag during the downward motion of the receptacle.

\* \* \* \* \*